Figure 1:
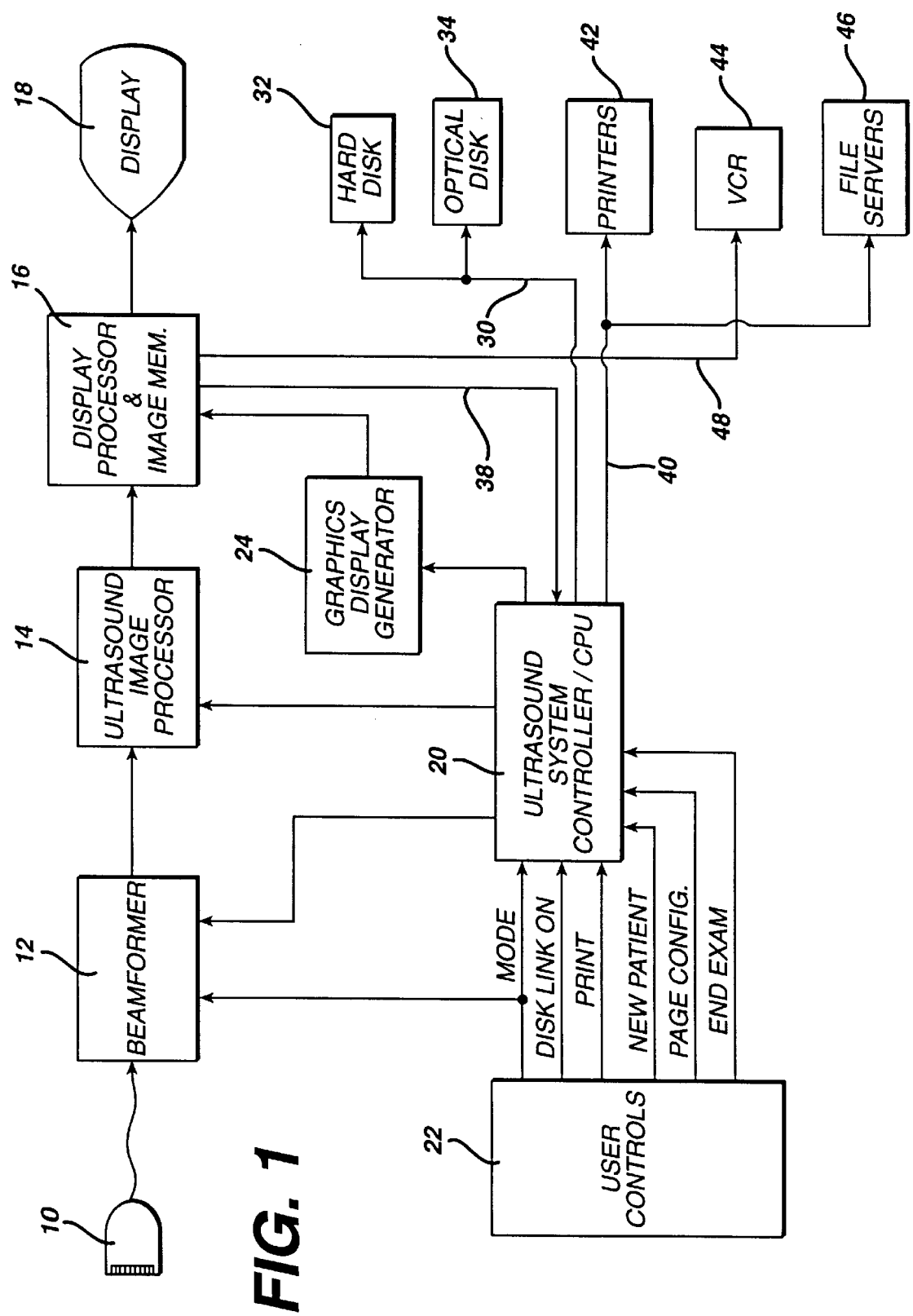

United States Patent [19]
Brown et al.

[11] Patent Number: 5,999,702
[45] Date of Patent: Dec. 7, 1999

[54] ULTRASONIC DIAGNOSTIC IMAGING SYSTEM WITH CENTRAL PRINTER MONITOR

[75] Inventors: Diane Brown, Redmond; Robert O. Alexander, Bellevue; Sonja D. Takatori, Mukilteo, all of Wash.

[73] Assignee: ATL Ultrasound, Inc., Bothell, Wash.

[21] Appl. No.: 08/762,824

[22] Filed: Dec. 6, 1996

[51] Int. Cl.⁶ .............................. G06F 3/14; G06K 15/00
[52] U.S. Cl. ...................... 395/106; 395/109; 345/348
[58] Field of Search ..................................... 395/101, 117, 395/106, 109; 345/348, 349, 350, 351, 977, 339

[56] References Cited

U.S. PATENT DOCUMENTS

| | | | |
|---|---|---|---|
| 5,060,135 | 10/1991 | Levine et al. | 345/351 |
| 5,237,648 | 8/1993 | Mills et al. | 345/349 |
| 5,335,082 | 8/1994 | Sable | 347/232 |
| 5,353,399 | 10/1994 | Kuwamoto et al. | 345/349 |
| 5,485,554 | 1/1996 | Lowitz et al. | 395/116 |
| 5,586,316 | 12/1996 | Tanaka et al. | 345/348 |
| 5,689,286 | 11/1997 | Wugofski | 345/348 |
| 5,734,915 | 3/1998 | Roewer | 707/512 |
| 5,852,440 | 12/1998 | Grossman et al. | 345/348 |

*Primary Examiner*—Edward L. Coles
*Assistant Examiner*—Joseph R. Pokrzywa
*Attorney, Agent, or Firm*—W. Brinton Yorks, Jr.

[57] ABSTRACT

An ultrasonic diagnostic imaging system displays a printer icon which illustrates to the user the print format in which ultrasound images selected for printing will be printed, and the number of images which may still be printed on the current sheet or roll of print media used by the printer. The printer may be connected to the ultrasonic imaging system for immediate printing of ultrasound images, or the ultrasound images may be stored and transported or transmitted to a printer for printing at a later time. The printer icon enables the user to monitor the consumption of printer media, the number of image areas available for printing on the current sheet or roll of printer media, to know the format in which ultrasound images will be printed on the printer media, and to know whether a printer being used is a color or black and white printer.

13 Claims, 2 Drawing Sheets

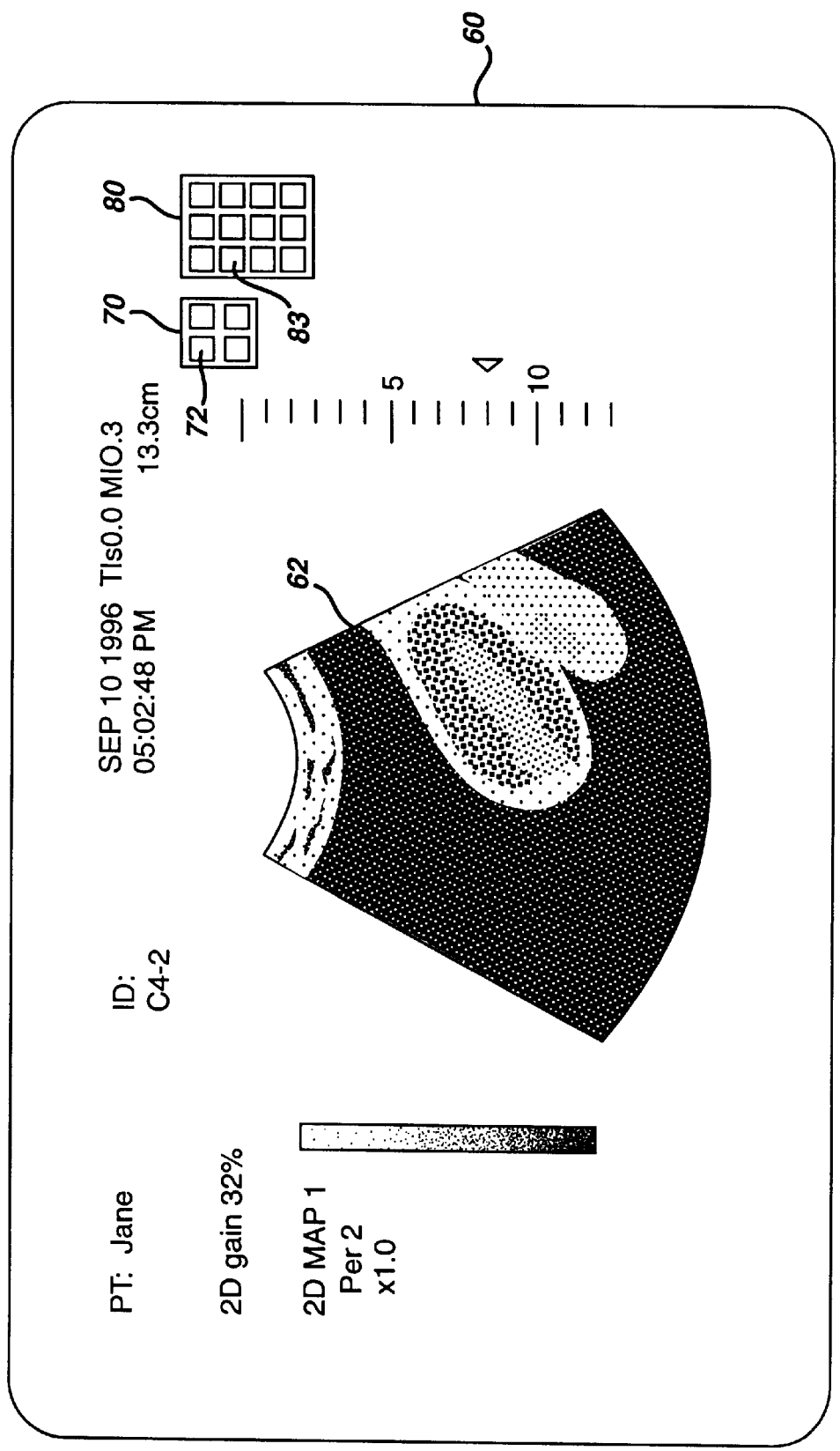

ULTRASONIC DIAGNOSTIC IMAGING SYSTEM WITH CENTRAL PRINTER MONITOR

This invention relates to ultrasonic diagnostic imaging systems which produce images of the interior of the body and, in particular, to the control and monitoring of external printers for printing diagnostic images from such systems.

Ultrasonic diagnostic imaging systems produce diagnostic images of tissue structure, vasculature, and flow conditions inside the body. In the United States it is common for ultrasound patient exams to be conducted by a medical technician called an ultrasonographer. The images resulting from the ultrasonographer's examination are reviewed later by a physician, who makes the diagnosis of the patient's condition. This procedure requires that the ultrasonographer store the images from the examination in the ultrasound system, on videotape, or on film for later review by the physician. Radiologists often prefer that the ultrasound studies to be reviewed by them be stored on film, a common medium used by radiologists to make diagnoses from a number of imaging modalities, such as CT, MRI, ultrasound, and x-ray. Cardiologists often prefer that their ultrasound studies be stored on videotape so that the dynamics of bloodflow, valve operation and the beating heart are preserved for diagnosis.

One option that is purchased with many ultrasound systems is a printer, which usually mounts in an OEM compartment of the system cart. Such a system-mounted printer is very convenient, as the ultrasound images on the system screen can be printed out immediately on film or photographic paper right at the ultrasound system. More recently, larger hospitals and clinics with many diagnostic imaging systems have been saving the expense of many local printers by centralizing the printer in the imaging department. Ultrasound images can be stored electronically on an optical disk using a feature such as the DiskLink™ available from the inventors' assignee company. The optical disk can be removed from the ultrasound system and taken to the central printer, where the ultrasound images stored on the optical disk are read out and printed. Another feature available from the inventors' assignee company, the NetLink™ feature, enables the ultrasound system to be connected to a digital information network which may include one or more centrally located printers. Ultrasound images which are to be printed are sent from ultrasound systems directly to a printer in electronic form over the network.

When the printer being used is no longer present locally on the ultrasound system, it becomes difficult to keep track of the number of images that have been designated for printing, and of the quantity of film or photographic paper that will be required to print them. This is especially true when ultrasound images are easily sent over a network to a remote printer at the touch of a button on the ultrasound system. If the printer is using sheets of film of twelve exposures each, sending eleven or thirteen images to the printer will waste image areas on a partially filled sheet of film. Sending color ultrasound images to a printer which is using only black and white film will result in loss of the color information. Furthermore, film comes in a variety of formats, making the tracking of several film formats of several printers on a network even more complex. Perhaps most significantly, the clinician has his or her attention focused on the patient and the conduct of the examination, and does not need the additional distraction of manually keeping track of how many images have been designated for printing, the printers selected to print the images, and whether the images are color or black & white. Accordingly, it is desirable to enable the operator to easily monitor printers, print formats, and the usage of film and paper to minimize the waste of materials, and to be assured that the image information is printed on the proper print medium.

In accordance with the principles of the present invention, an ultrasound system includes a display screen monitor which monitors the usage of printing materials during a patient examination. The screen monitor includes a graphic icon which indicates to the system operator the film or paper format employed at a remote printer. As ultrasound images are designated for printing, the graphic icon is filled in to show the operator how much film or paper has been used, and the amount remaining on the present sheet. As new sheets are used for a particular patient, the operator is informed of the number of pages of film or paper being used for the particular exam. The monitor can display separate graphic icons for color and black & white printers, and the system will automatically send color and black & white images to the proper printer.

In the drawings:

FIG. 1 illustrates in block diagram form an ultrasonic diagnostic imaging system which is constructed in accordance with the present invention; and FIG. 2 illustrates a screen display of an ultrasound system of the present invention, including a printer film icon.

Referring first to FIG. 1, an ultrasonic diagnostic imaging system which is constructed in accordance with the present invention is shown. An ultrasonic transducer probe 10 transmits ultrasonic waves under control of a beamformer 12. Echoes returned from the transmitted waves are received by the probe, converted to electrical signals, and coupled to the beamformer. Echoes from individual elements of the probe transducer are delayed and summed to form beams of coherent echo information. The echo beams are coupled to an ultrasound image processor 14 which processes the echo information in a variety of ways for the desired image. The echoes may be processed to develop so-called 2D images, which are black & white images of the tissue structure being imaged. The echoes may be Doppler processed to produce color images of the flow conditions in the body. The processed echo information is coupled to a display processor and image memory 16 which arranges the echo information in a display format, along with graphical information such as the patient's name and the operating parameters of the ultrasound system under which the ultrasound image was acquired. The display image is then displayed on the screen of the ultrasound system display 18. Alternatively or in addition, display images may be recorded on a VCR 44 by transmission of the images directly over an Svideo line 48.

The display image may also be recorded or stored on other media for later review and diagnosis. The digital image may be stored on a hard disk 32 or an optical disk 34 which are connected to the ultrasound system SCSI bus 30. Images are transferred by the CPU of the ultrasound system controller/CPU 20 from the display processor and image memory to the hard disk 32 or optical disk 34 as directed by the ultrasound system operator. The display image may also be sent under CPU control over an Ethernet network 40 to remote or local printers 42 or file servers 46.

The ultrasound system has a number of user controls 22 by which the operator control the functioning of the ultrasound system. A number of these controls are connected to the ultrasound system controller/CPU 20, which controls the operation and interaction of the various subsystems of the ultrasound system, such as the beamformer 12 and the ultrasound image processor 14. For example, the operator may manipulate the controls to select a C4–2 probe, which is to be operated in the colorflow mode. The mode control of the user controls 22 would respond to this selection by issuing a "mode" command to the system controller 20 for the colorflow mode. The system controller would then condition the beamformer 12 to control and form a beam of echo signals from a C4–2 probe, and would condition the image processor 14 to perform colorflow Doppler processing of the echo signals. The system controller 20 would also command a graphics display generator 24 to display the selected probe type, C4–2, on the display screen. This process would result in a colorflow ultrasound image being displayed on the display screen along with the C4–2 probe type designation.

In accordance with the principles of the present invention, the user controls can also be manipulated to send display images for printing on a remote printer. When either the DiskLink or NetLink option is turned on, a "Disk Link On" command issues from the user controls 22 to so inform the system controller 20. The system controller then causes a configurable printer icon to be displayed con the system display 18 as shown in FIG. 2. This drawing shows a typical ultrasound system display screen 60 of the present invention. In the center of the display screen is an ultrasound image 62. Above and on either side of the ultrasound image are graphical displays such as image depth, focal depth, color/greyscale map, patient ID, and probe ID, which are produced by the graphics display generator 24 and combined with the ultrasound image 62 for display. In the upper right corner of the display screen 60 are two printer icons 70 and 80. The printer icon 70 contains four small boxes, depicting the four image areas of a 2×2 sheet of film. Printer icon 80 contains twelve small boxes depicting the twelve image areas of a 3×4 sheet of film.

The operator configures the printer icon or icons displayed in accordance with the film or paper format of the printer to which display images will be sent for printing. The operator does this through the user controls 22, which send "Page Config." commands to the ultrasound system controller 20. In response to these commands, the system controller causes the graphics display generator 24 to display the proper printer icon on the display screen 60. The operator can select a 2×2 format icon, a 3×4 format icon, both icons, or a custom icon, either alone or in combination with one of the prestored printer icons. With the icons properly configured, the operator simply selects the film format to be used for black & white and/or color printing, and the ultrasound system displays the appropriate printer icon or icons.

With the printer icon configured in accordance with the printer or printers connected to the ultrasound system, the operator can send display images on the display screen to the printer for printing. This is done by pressing the "print" button on the ultrasound system, which issues a "print" command to the system controller. The system controller then causes the display processor to transmit the display image to the printer, or to be stored on the optical disk if the optical disk is to store images for printing. As it does so, the system controller also commands the graphics display generator 24 to fill in one of the small boxes on the printer icon, as shown by box 72 in icon 70 of FIG. 2. The filled in box informs the operator that one of the image areas of the 2×2 sheet of film in the printer has been used, and that three more image areas are still available before the sheet of film is full. In addition to filling in the icon box, the controller also causes the ultrasound system to issue a single audible "beep" to the operator. The operator will know exactly how much film has been used for this exam, and the space remaining on a sheet for additional images before the current sheet is full. Thus, the operator can continuously monitor film usage.

When a sheet is full, the controller causes the system to beep twice and the small boxes in the icon are cleared, signifying that subsequent images will be sent for printing on a new sheet of film. The notation "page 2" appears below the icon, indicating to the operator that a second sheet of film will be used for the exam. Ending the exam at this point, of course, will not result in use of another sheet of film for the current patient exam. When the operator is finished examining a patient, the End Exam button is pressed, and the printer discharges the current sheet of film of patient images from the exam.

When the operator enters the name of a new patient for another patient exam, the command "New Patient" issues from the user controls to the system controller. The system controller commands the printer to increment to a new sheet of film for the new patient (assuming that the system is set up to do so, rather than continue to print to the current sheet of film). The system controller also clears the icon to indicate to the operator that the images from the new patient will be printed on a new sheet of film. The notation below the icon is changed to "page 1" to indicate that this is the first sheet of film for the new patient.

In a preferred embodiment of the present invention, the system controller can be configured by the user to automatically select the proper printer for color and black & white images. As an example, suppose that icon 70 is for a black & white printer which prints in a 2×2 format, and icon 80 is for a color printer which prints in a 3×4 format. The icon 80 is designated to be a color printer, by outlining the icon in color, for instance. When the operator presses the "print" button on the user controls, the system controller responds by checking the current "mode" of system operation. If the current mode is the colorflow mode, for instance, the controller knows that color images are being produced and accordingly the image on the display screen 60 is sent to the color printer represented by the color icon 80. If the system were operating in the 2D mode so that black & white images were currently being produced, the controller would send the display screen image to the black & white printer represented by the icon 70. The operator has the option, of course, of overriding the automatic operation and sending the display screen image to the printer of the operators own choosing. In the example of FIG. 2, for instance, the icons 70 and 80 are showing that one image 72 has been sent for printing on the current sheet of black & white film in the black & white printer, and four images 83 have been designated for printing on the current film sheet of the color printer.

In a constructed embodiment of the present invention, the ultrasound system can be programmed to recognize the variety of ultrasound image formats which need to be printed in color and hence directed to a color printer. These include colorflow images, power Doppler images, color M-mode images, color spectral displays, and color B mode image formats. It is to be understood that a single printer can be capable of printing both color and black & white images. Hence, the icons will effectively command the printer to print the images in the proper print mode, i.e., color or black & white.

In a constructed embodiment of the present invention, the printer icon(s) are normally only displayed when one of the remote connection features, DiskLink or NetLink, is activated. When the local printer in the systems OEM compartment is used as the current printer, the icon is not used, as the printer and its status are readily in view of the operator, although this default state of operation can be overridden by the operator if desired. The printer icon of the present invention is only used when images are to be printed on a remote printer which may not be visible to the ultrasound system operator. The printer icon may also be used when the local printer on the ultrasound system cart is a multi-format camera, allowing the operator to keep track of film usage on the local camera.

It is also useful to temporarily buffer or batch images designated for printing on the ultrasound system. The ultrasound system may store designated images until a patient examination is finished, then send all of the images designated for printing to the printer at the end of the examination.

What is claimed is:

1. An ultrasonic diagnostic imaging system which provides display information concerning a print medium used for printing color and black and white ultrasound images comprising:

an image display screen for displaying an ultrasound image produced by said system;

a print control for controlling the printing of an ultrasound image on said print medium; and a display generator, coupled to said image display screen, for simultaneously displaying a plurality of printer icons on said display screen which provide information as to the image print format, the color/black and white nature of the print media, and the number of image areas used or remaining to be used on the print media of a plurality of ultrasound image printers.

2. The ultrasonic diagnostic imaging system of claim 1, wherein each of said printer icons represents a printer to which said system may direct the printing of ultrasound images.

3. The ultrasonic diagnostic imaging system of claim 2, wherein each of said printer icons further represents the film or print area format of a printer to which said system may direct the printing of ultrasound images.

4. The ultrasonic diagnostic imaging system of claim 2, wherein each of said printers is connected to a network to which said ultrasound system is connected.

5. The ultrasonic diagnostic imaging system of claim 1, further comprising an ultrasound image processor, coupled to said image display screen, for producing ultrasound images; and wherein said display screen simultaneously displays an ultrasound image produced by said image processor and said printer icons.

6. The ultrasonic diagnostic imaging system of claim 1, wherein said display generator comprises means for displaying a printer icon of a first appearance to represent a color printer, and a printer icon of a second appearance to represent a black and white printer.

7. An ultrasonic diagnostic imaging system which provides display information concerning a print medium used for printing color or black and white ultrasound images comprising:

an image display screen for displaying an ultrasound image produced by said system;

a print control for controlling the printing of an ultrasound image on said print medium; and a display generator, coupled to said image display screen, for simultaneously displaying a plurality of printer icons on said display screen which provide information as to the image print format and the number of image areas used or remaining to be used on the print media of a plurality of ultrasound image printers;

wherein said display generator comprises means for displaying a printer icon of a first appearance to represent a color printer, and a printer icon of a second appearance to represent a black and white printer; and wherein said print control comprises means for directing the printing of an ultrasound image on the printer represented by an icon of said first appearance when said ultrasound image is a color image, and for directing the printing of an ultrasound image on the printer represented by an icon of said second appearance when said ultrasound image is a black and white image.

8. The ultrasonic diagnostic imaging system of claim 7, wherein said first appearance comprises a first icon format and said second appearance comprises a second icon format.

9. The ultrasonic diagnostic imaging system of claim 7, wherein said first appearance comprises a first icon color and said second appearance comprises a second icon color.

10. An ultrasonic diagnostic imaging system which provides display information concerning a print medium used for printing color and black and white ultrasound images comprising:

an ultrasound image processor for producing an ultrasound image;

an image display screen for displaying ultrasonic images produced by said image processor;

a print control for controlling the printing of an ultrasound image on said print medium;

a display generator, coupled to said image display screen, for generating a printer icon for display on said display screen which provides information as to the number of image areas used or remaining to be used on the print media of an ultrasound image printer; and an icon configuration control, coupled to said display generator, for adjusting the appearance of said icon.

11. The ultrasonic diagnostic imaging system of claim 10, wherein said display generator is responsive to said print control for highlighting a symbol of said printer icon when an ultrasound image is designated to be printed.

12. An ultrasonic diagnostic imaging system which provides display information concerning a print medium used for printing color and black and white ultrasound images comprising:

an ultrasound image processor for producing an ultrasound image;

an image display screen for displaying ultrasonic images produced by said image processor;

a print control for controlling the printing of an ultrasound image on said print medium;

a display generator, coupled to said image display screen, for generating a printer icon for display on said display screen which provides information as to the number of image areas used or remaining to be used on the print media of an ultrasound image printer; and an icon configuration control, coupled to said display generator, for adjusting the appearance of said icon, wherein said icon configuration control, comprises means for adjusting the appearance of said icon to have a first appearance when said printer icon represents a color printer, or a second appearance when said printer icon represents a black and white printer.

13. The ultrasonic diagnostic imaging system of claim 12, wherein said display generator generates a black and white icon in response to the adjustment to said second appearance, and a color icon in response to the adjustment to said first appearance.

* * * * *